(12) United States Patent
Baker et al.

(10) Patent No.: US 6,501,458 B2
(45) Date of Patent: Dec. 31, 2002

(54) MAGNETICALLY COUPLED INPUT DEVICE

(75) Inventors: Thomas M. Baker; Christopher M. Seyfert; Michael D. Seyfert, all of Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/343,919

(22) Filed: Jun. 30, 1999

(65) Prior Publication Data

US 2002/0003527 A1 Jan. 10, 2002

(51) Int. Cl.$^7$ ................................................ G09G 5/08
(52) U.S. Cl. ...................... 345/161; 345/167; 74/471 R
(58) Field of Search ............................... 345/156–167; 74/471, 471 R; 414/694; 341/20; 200/6 A (56) References Cited

U.S. PATENT DOCUMENTS

| | | | | |
|---|---|---|---|---|
| 3,987,685 A | * | 10/1976 | Opocensky | 74/471 R |
| 4,306,208 A | | 12/1981 | Coors | 336/30 |
| 4,459,578 A | | 7/1984 | Sava et al. | 338/128 |
| 4,489,303 A | | 12/1984 | Martin | 338/128 |
| 4,500,867 A | | 2/1985 | Ishitobi et al. | 338/128 |
| 4,654,576 A | | 3/1987 | Oelsch et al. | 322/3 |
| 4,685,678 A | | 8/1987 | Frederiksen | 273/148 B |
| 4,748,441 A | | 5/1988 | Brzezinski | 340/709 |
| 4,825,157 A | | 4/1989 | Mikan | 324/208 |
| 4,853,630 A | | 8/1989 | Houston | 324/208 |
| 4,879,556 A | | 11/1989 | Duimel | 341/20 |
| 5,065,146 A | | 11/1991 | Garrett | 340/709 |
| 5,128,671 A | | 7/1992 | Thomas, Jr. | 341/20 |
| 5,160,918 A | | 11/1992 | Saposnik et al. | 340/709 |
| 5,168,221 A | | 12/1992 | Houston | 324/207.13 |
| 5,293,900 A | | 3/1994 | Karbassi et al. | 137/554 |
| 5,421,694 A | | 6/1995 | Baker et al. | 414/694 |
| 5,559,432 A | * | 9/1996 | Logue | 324/207.17 |
| 5,619,195 A | | 4/1997 | Allen et al. | |
| 5,620,371 A | * | 4/1997 | Blonder | 463/37 |
| 5,831,553 A | * | 11/1998 | Lenssen et al. | 341/20 |
| 5,831,596 A | * | 11/1998 | Marshall et al. | 345/161 |
| 5,969,520 A | | 10/1999 | Schottler | |
| 6,201,196 B1 | * | 2/2001 | Wergen | 200/6 A |

* cited by examiner

Primary Examiner—Steven Saras
Assistant Examiner—Amr Awad
(74) Attorney, Agent, or Firm—Clifton G Green; Kelsey L Milman (57) ABSTRACT

An apparatus for transmitting a signal corresponding to a rotation of a spherical body. The apparatus includes a housing having an aperture, and a substantially spherical body having a first portion disposed within the housing so as to have a portion of the body disposed within the aperture, the spherical body operable to rotate within the housing. A first and second permanent magnets are disposed within the spherical body, and are operable to emit a magnetic field. A first magnetic sensing device is disposed within the housing, the first magnetic sensing device being operable to detect the magnetic fields and to generate a first output signal as a function of the strength of the magnetic fields. The first output signal is transmitted via a first conductive path coupled with the sensor.

24 Claims, 6 Drawing Sheets

MAGNETICALLY COUPLED INPUT DEVICE

TECHNICAL FIELD

This invention relates generally to control input devices, and more specifically to control input devices using non-contacting magnetic devices and sensors.

BACKGROUND ART

In the field of work machines, particularly those machines which perform digging or loading functions such as excavators, tractors, backhoe loaders, and front shovels, the work implements are generally manually controlled with two or more operator controls in addition to other machine function controls. The manual control system often includes foot pedals as well as hand operated levers. There are several areas in which these types of implement control schemes can be improved to alleviate operator stress and fatigue resulting from the manipulation of multiple levers and foot pedals. For example, a machine operator is required to possess a relatively high degree of expertise to manipulate and coordinate the multitude of control levers and foot pedals proficiently. To become productive an inexperienced operator requires a long training period to become familiar with the controls and associated functions.

Some manufacturers recognize the disadvantages of having too many control levers and have adapted a two lever control scheme as the norm. Generally, two vertically mounted levers, such as joysticks, share the task of controlling the linkages (e.g., boom, stick, and bucket) of the work implement. For example, Caterpillar excavators employ one joystick for stick and swing control, and another joystick for boom and bucket control.

One disadvantage of many joysticks, particularly with digital joysticks, is the use of contacting switches. For example, joystick contacting switches are used to control direction of movement. However, such switches are subject to wear, necessitating switch replacement or repair. Other joysticks use potentiometers, or mechanical means to control the direction of movement. These types of joysticks, however, are typically of low reliability. Thus, the long term cost of the above joysticks may be quite high. Further, when a joystick is not operating properly, the machine often cannot be used. This "down-time" greatly adds unacceptable burdens to the machine owner/lessor due to time restrictions on most jobs.

Several attempts have been made to overcome the problems of contact-type joysticks with non-contacting technology. For example, some non-contacting control handles use inductive sensors for detecting the displacement of a control shaft from a neutral position. However, such inductive sensors are susceptible to electromagnetic interference, are complex to manufacture, and require expensive drive circuitry for operation.

Another type of non-contacting joystick uses hall effect devices to detect the position of the control shaft from a neutral position. However, some hall effect devices have problems similar to the inductive sensors discussed above. Further, many hall effect joysticks typically require complicated design and manufacturing for the placement of magnets and sensors, such as mounting the magnets on counterbalances, or requiring other complex mounting schemes. As the complexity of the input device increases, so does its cost. In addition, the likelihood of failure/breakdown increases with the complexity of the design.

DISCLOSURE OF THE INVENTION

The present invention provides apparatus for transmitting a signal corresponding to a rotation of a spherical body. The apparatus includes a housing having an aperture, and a substantially spherical body having a first portion disposed within the housing so as to have a portion of the body disposed within the aperture, the spherical body being operable to rotate within the housing. A first and second permanent magnets are disposed within the spherical body, and are operable to emit a magnetic field. A first magnetic sensing device is disposed within the housing, the first magnetic sensing device operable to detect the magnetic fields and to generate a first output signal as a function of the strength of the magnetic fields. The first output signal is transmitted via a first conductive path coupled with the sensor.

BEST MODE FOR CARRYING OUT THE INVENTION

Figure 1:
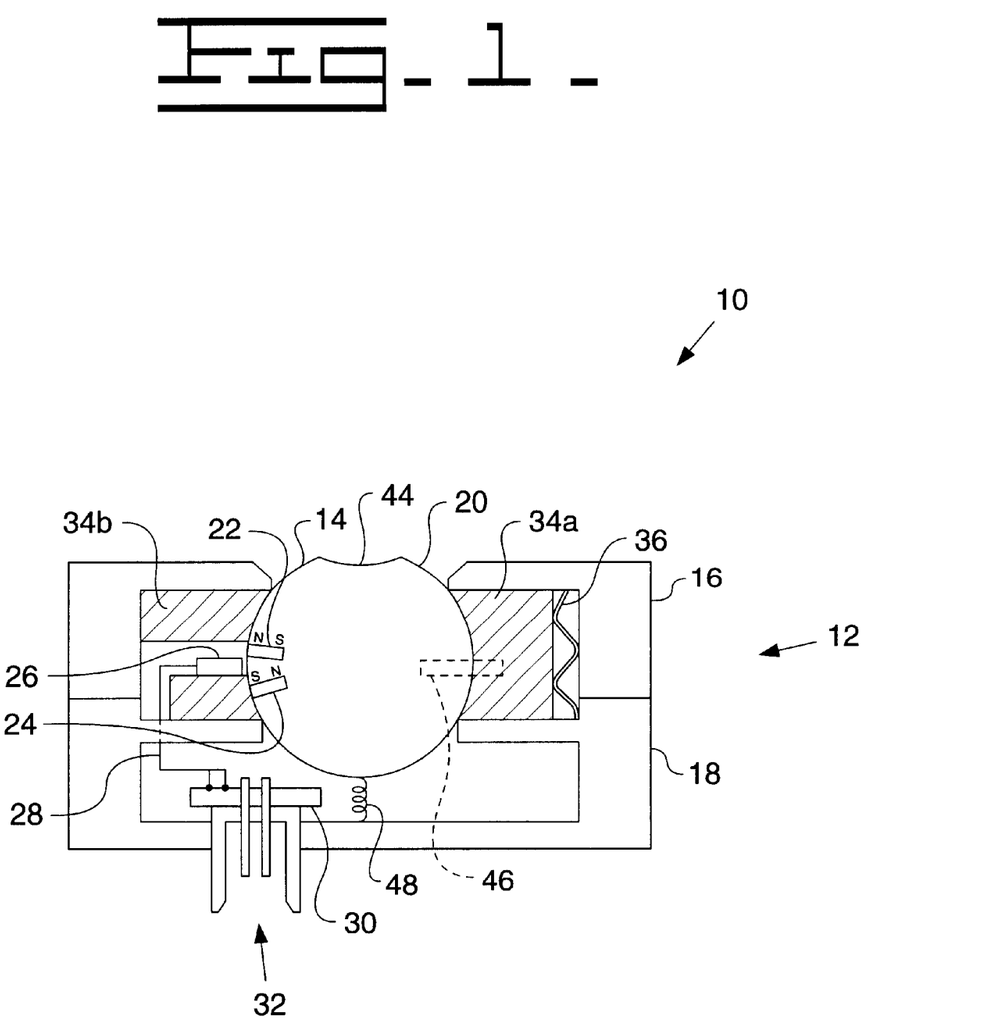
FIG. 1 is a cross sectional view of an input device according to one embodiment of the invention.

FIG. 1 is a cross sectional view of an input device 10 according to one embodiment of the invention. The input device 10 includes a housing 12 having an aperture 14. In one embodiment, the housing 12 is made of two sections 16, 18 coupled together, although a either a greater or lesser number of sections may also be used. A substantially spherical body 20 is disposed at least in part within the housing 12 and has a portion substantially within the aperture 14. The spherical body 20 may have flat spots or indentations (discussed below), but preferably is substantially spherical. The spherical body 20 is operable to rotate within the housing 12.

In one embodiment, the housing 12 has at least two sections and exerts a frictional force on the spherical body 20. The frictional force may be controlled by how firmly the sections are coupled together.

A first and second permanent magnets, such as bar or rod magnets 22, 24, are disposed within the spherical body 20, with one pole of each magnet 22, 24 being substantially flush with a surface of the spherical body 20, and the other pole being a predetermined distance from the surface of the spherical body, preferably in a direction towards the center of the spherical body 20, i.e., on a radial line of the spherical body 20. The first and second magnets are oriented so that one magnet 22, 24 has a north pole substantially flush with the surface of the spherical body, and the other magnet 22, 24 has a south pole substantially flush with the surface of the spherical body 20.

A magnetic sensing device, such as a hall effect device 26, is located at least in part within the housing 12 along an axis of rotation of the spherical body 20 that causes the first and second magnets 22, 24 to pass nearby. A first conductive path, such as a wire 28, circuit board 30, and connector 32, is coupled with the hall effect device 26 and provides an electrically conductive path for transmitting electrical signals from the hall effect device 26 out of the housing 12.

In one embodiment, circuitry (not shown) on the circuit board 30, or outside of the housing 12, receives the electrical signals from the hall effect device 26. The circuitry processes the electrical signals, e.g., performing signal translation or conditioning, and transmits a second electrical signal as a function of the received electrical signal. For example, the circuitry may convert a voltage into a pulse width modulated signal (PWM). Other types of signal processing known to those skilled in the art may also be used.

In one embodiment, a non-magnetic bearing 34a is adjacent to the spherical body 20, and is preferably shaped so as to receive the spherical body, e.g., having a concave surface of the same radius as the spherical body 20. In one embodiment, a biasing device, such as a wave washer 36 or spring (not shown) is coupled with the bearing 34a and biases the bearing 34a against the spherical body 20 thereby causing the bearing 34a to exert a frictional force on the spherical body 20. As the spherical body 20 and/or the bearing 34a wear, the wave washer 36 presses the bearing 34a against the spherical body 20, taking up any slack, thereby substantially maintaining the original spatial relationship and frictional force between the bearing 34a and the spherical body 20. The magnitude of the frictional force may be selected by an appropriate selection of the biasing device.

In one embodiment, a second bearing, or portion 34b of the first bearing 34a, is disposed within the housing 12 and shaped to receive the spherical body 20. The second portion 34b is typically located opposite the first bearing 34a. The second portion 34b provides a fixed boundary and contact point for the spherical body 20. While the first and second bearing portions 34a, 34b are shown split vertically, a horizontal split, or any other appropriate orientation may also be used.

In operation a user (not shown) rotates the spherical body 20 so that one of the first and second magnets 22, 24 approach the hall effect device 26. As the first and second magnets 22, 24 approach the hall effect device 26, the hall effect device 26 detects a magnetic field emanating from the respective first and second magnets 22, 24, and transmits an output signal that is a function of the characteristics of the detected magnetic field, such as magnitude and polarity. One example of a typical output signal is a voltage signal corresponding to characteristics of the detected magnetic field. The voltage typically ranges from 0–5 volts over the range of movement of the spherical body 20, with 2.5 volts indicating a neutral position (discussed below). A circuit (not shown) converts the voltage signal into a pulse width modulated signal The processing of voltage signals into pulse width modulated signals, and circuits to accomplish this, is known to those skilled in the art.

Figure 2A:
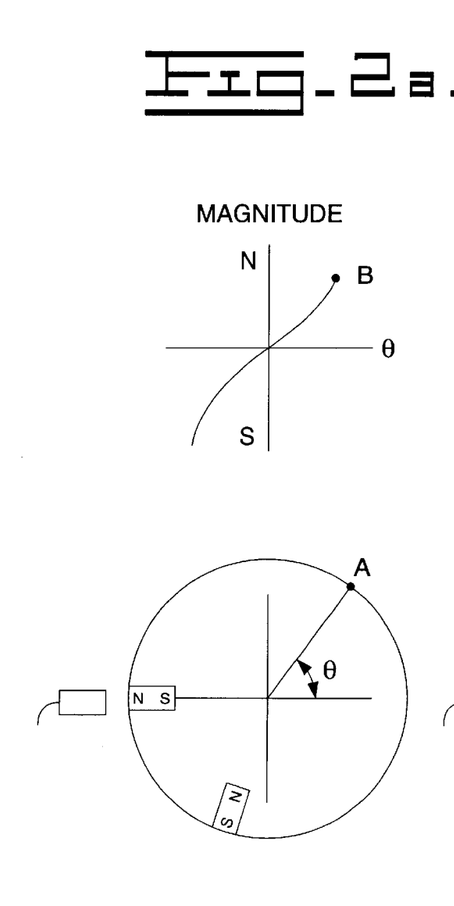
FIGS. 2a, 2b, and 2c are graphs of magnitude and polarity of the magnetic field detected by the hall effect device according to one embodiment of the invention.
Figure 2B:
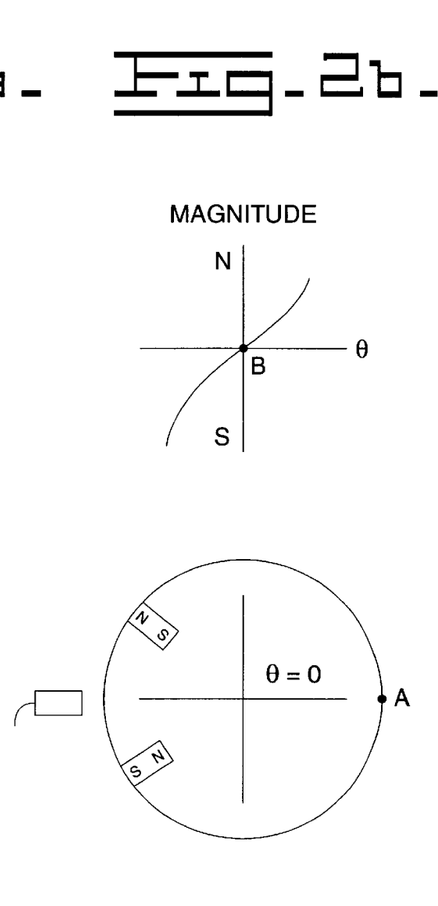
Figure 2C:
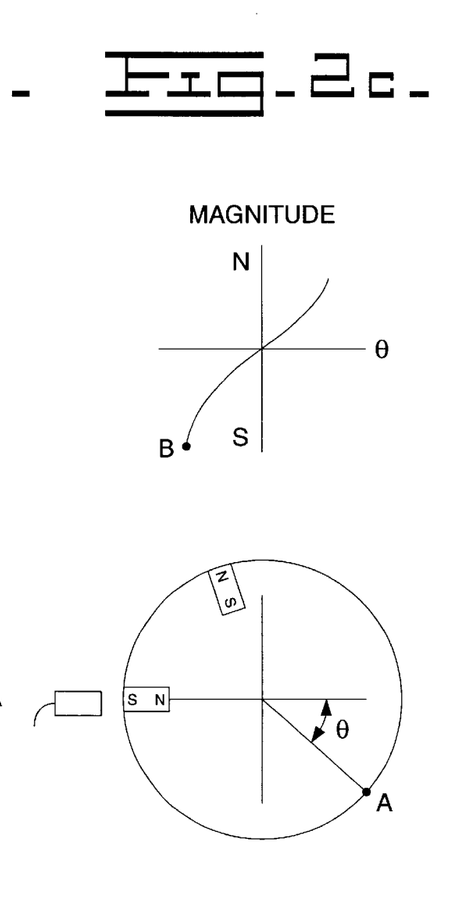

FIGS. 2a, 2b, and 2c are graphs of magnitude and polarity of the magnetic field detected by the hall effect device according to one embodiment of the invention. FIG. 2a is a cross sectional view of the spherical body 20 rotated an angle θ counterclockwise from a neutral position (i.e., a positive θ). This rotation brings the first magnet 22 into close proximity with the hall effect device 26, and moves the second magnet 24 away from the hall effect device 26. Thus, the hall effect device will detect a strong magnetic field having a first polarity (i.e., the polarity of the first magnet 22), shown as point B on the graph.

FIG. 2b is a cross sectional view of the spherical body 20 in the neutral position. The first and second magnets 22, 24 are approximately an equal distance from the hall effect device. Because the first and second magnets 22, 24 are of opposite polarity (one having its north pole flush with the surface of the spherical body 20, and the other having its south pole flush with the surface of the spherical body 20), the net magnetic field detected by the hall effect device is zero (assuming magnets 22, 24 are of the same strength), shown as point B on the graph. Alternately, the strength of the magnetic field generated by the first and second magnets 22, 24 may be sufficiently low and/or their distance from the hall effect device 26 may be sufficiently high that the hall effect device 26 does not detect a magnetic field when the spherical body 20 is in the neutral position.

FIG. 2c is a cross sectional view of the spherical body 20 rotated an angle θ clockwise from a neutral position (i.e., a negative angle θ). This rotation moves the first magnet 22 away from the hall effect device and moves the second magnet 24 into close proximity with the hall effect device 26. Thus, the hall effect device 26 will detect a strong magnetic field having a second polarity. The second polarity will be of opposite polarity to the first polarity, i.e., the polarity of the second magnet 24, shown as point B on the graph.

Significantly, because the first and second magnets 22, 24 have poles of opposite polarity that are flush with the surface of the spherical body 20, a magnetic field having a unique magnitude and polarity will be detected by the hall effect device 26 for each rotational position shown, as well as for any intermediate position of the spherical body 20.

If the spherical body 20 is rotated further away (either counterclockwise or clockwise respectively) from the neutral position (FIG. 2b) than shown in FIGS. 2a and 2c, additional magnets (not shown) may be needed to maintain the 1:1 relationship between the magnitude of the magnetic field and the rotational position of the spherical body 20: the hall effect device 26 will detect a magnitude and polarity of X gauss (from a north pole, for example), when the first magnet 22 is at both $0.8\pi$ and $1.2\pi$ radians, for example, i.e., two positions rotated an equal degree clockwise and counterclockwise from $\pi$ radians (where the hall effect device 26 is located).

In one embodiment, the rotation of the spherical body 20 is limited to a certain angle θ, with θ being sufficiently small to avoid either of the first and second magnets 22, 24 from passing by the hall effect device 26, e.g., less than or equal to an angle of the magnet 22, 24 from the hall effect device 26 when the spherical body 20 is in the neutral position. The limiting typically avoids the problem described above, and maintains the unique relationship between the position of the spherical body 20 and the characteristics of the magnetic field detected by the hall effect device 26. The limiting may be accomplished by any of a variety of appropriate ways known to those skilled in the art.

In another embodiment, an additional hall effect device (not shown) may be used to distinguish between the rotational positions described above by methods known to those skilled in the art.

Figure 3:
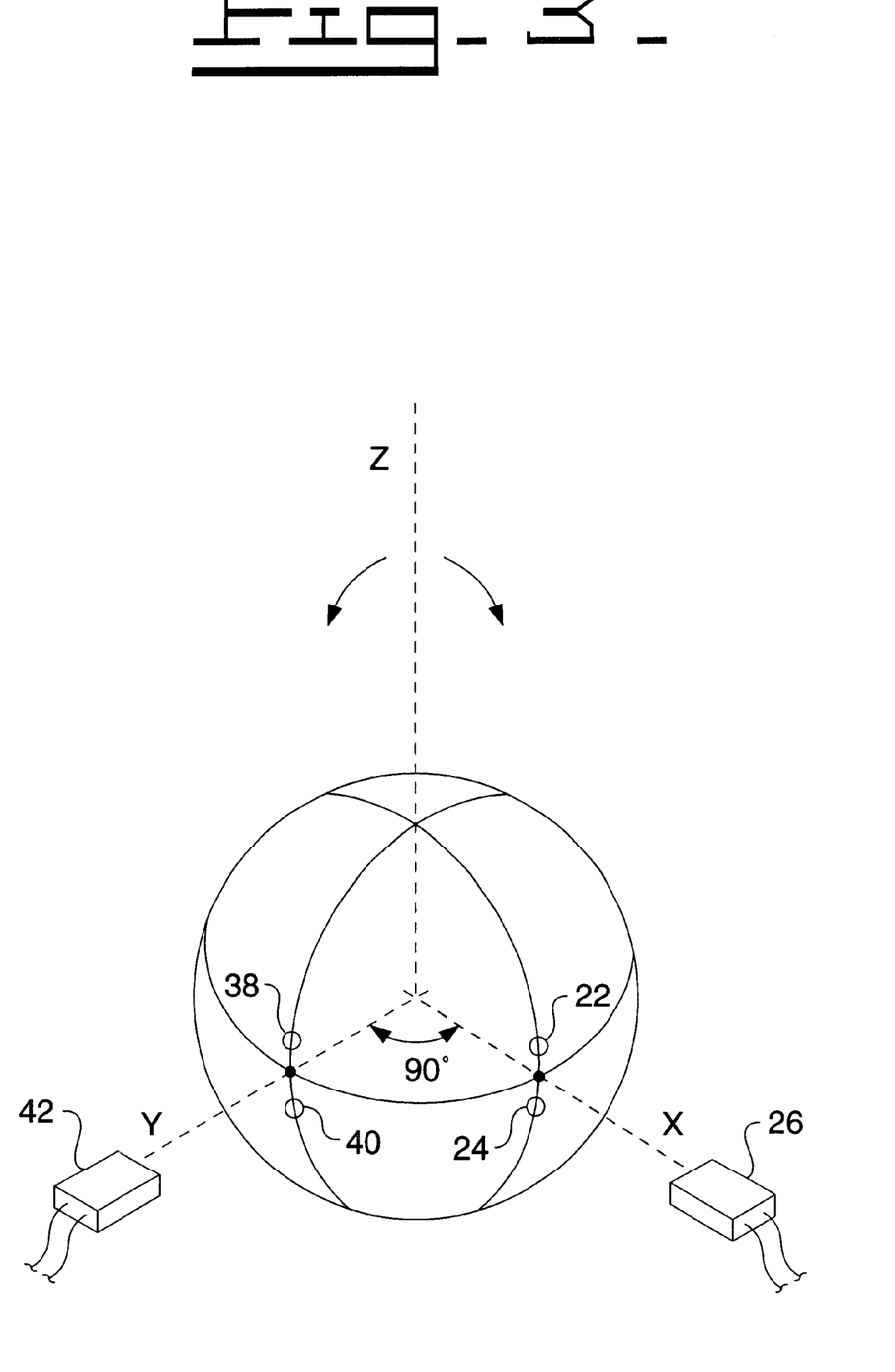
FIG. 3 is a perspective view of a spherical body for use in a multi-axis input device according to one embodiment of the invention.

FIG. 3 is a perspective view of a spherical body 20 for use in a multi-axis input device according to one embodiment of the invention. A third and fourth bar magnets 38, 40 are radially aligned in the spherical body 20, with each magnet 38, 40 preferably having an end substantially flush with the surface of the spherical body 20. The end of the magnets 38, 40 that are flush with the surface are of opposite polarity from each other. Preferably, the third and fourth magnets 38, 40 are approximately 90 degrees from the first and second magnets 22, 24, thereby allowing for detection of rotation of the spherical body 20 in both an X and Y axes. A magnetic sensing device, such as a second hall effect device 42 is positioned appropriately to detect the magnetic fields emitted from the third and fourth magnets 38, 40. Thus, the first hall effect device 26 detects rotation of the spherical body 20 about the Y axis, and the second hall effect device 42 detects rotation about the X axis.

Referring back to FIG. 1, in one embodiment a recess 44 is located in the portion of the spherical body 20 within the aperture 14 when the spherical body is in the neutral position. The recess 44 is preferably shaped to receive a fingertip (not shown) of the operator, and may provide improved tactile feedback to the operator as compared to the smooth spherical body 20.

In one embodiment, an anti-rotation device, such as a pin 46 is coupled with the spherical body 20. A slot, such as a vertical slot (not shown), is formed within the housing 12, preferably within the bearing 34, and the pin 46 is slidably disposed within the slot. Thus, the spherical body may rotate about two axes (e.g., the X and Y axes of FIG. 3), with the pin 46 either sliding or rotating within the slot, but the pin 46 prevents rotation about the third axis (e.g., the Z axis of FIG. 3).

In one embodiment, a centering device, such as a spring 48 may be coupled between the housing 12 and the spherical body 20. The spring 48 biases the spherical body 20 to a predetermined position, such as a neutral position.

Figure 4A:
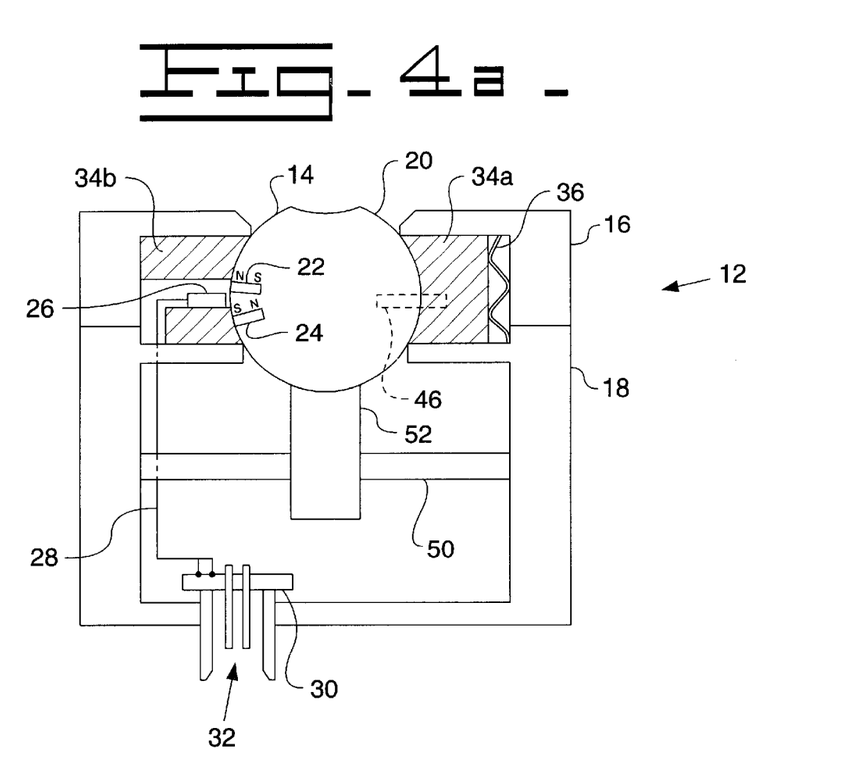
FIGS. 4a–b is a cross sectional view of an input device having an elastic "doughnut" as the centering device according to one embodiment of the invention.
Figure 4B:
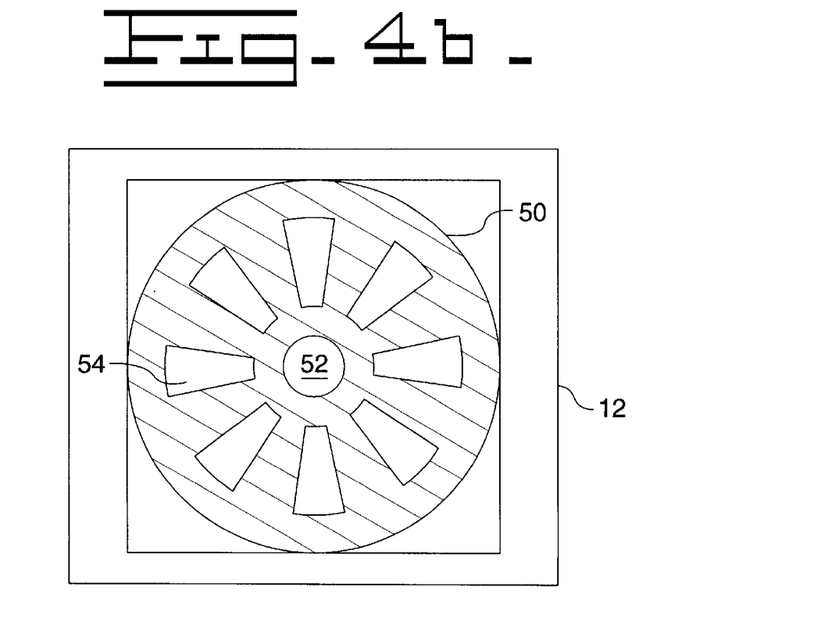

FIG. 4a is a cross sectional view of an input device having an elastic "doughnut" 50 as the centering device according to one embodiment of the invention. The doughnut 50 is an elastic material and is typically coupled with the spherical body 20 via a rod 52. As shown in FIG. 4b, the doughnut 50 is preferably in the shape of a toroid, with the rod 52 located within a center hole of the toroid. The doughnut 50 may be coupled with the housing 12 by any of a variety of appropriate ways known to those skilled in the art, such as by a frictional fit. Holes 54 may be placed within the doughnut 50 to lower the resistance to deformation by the doughnut 50, and may be shaped to provide differential load feedback in different directions to a fixed rotational angle.

Figure 5:
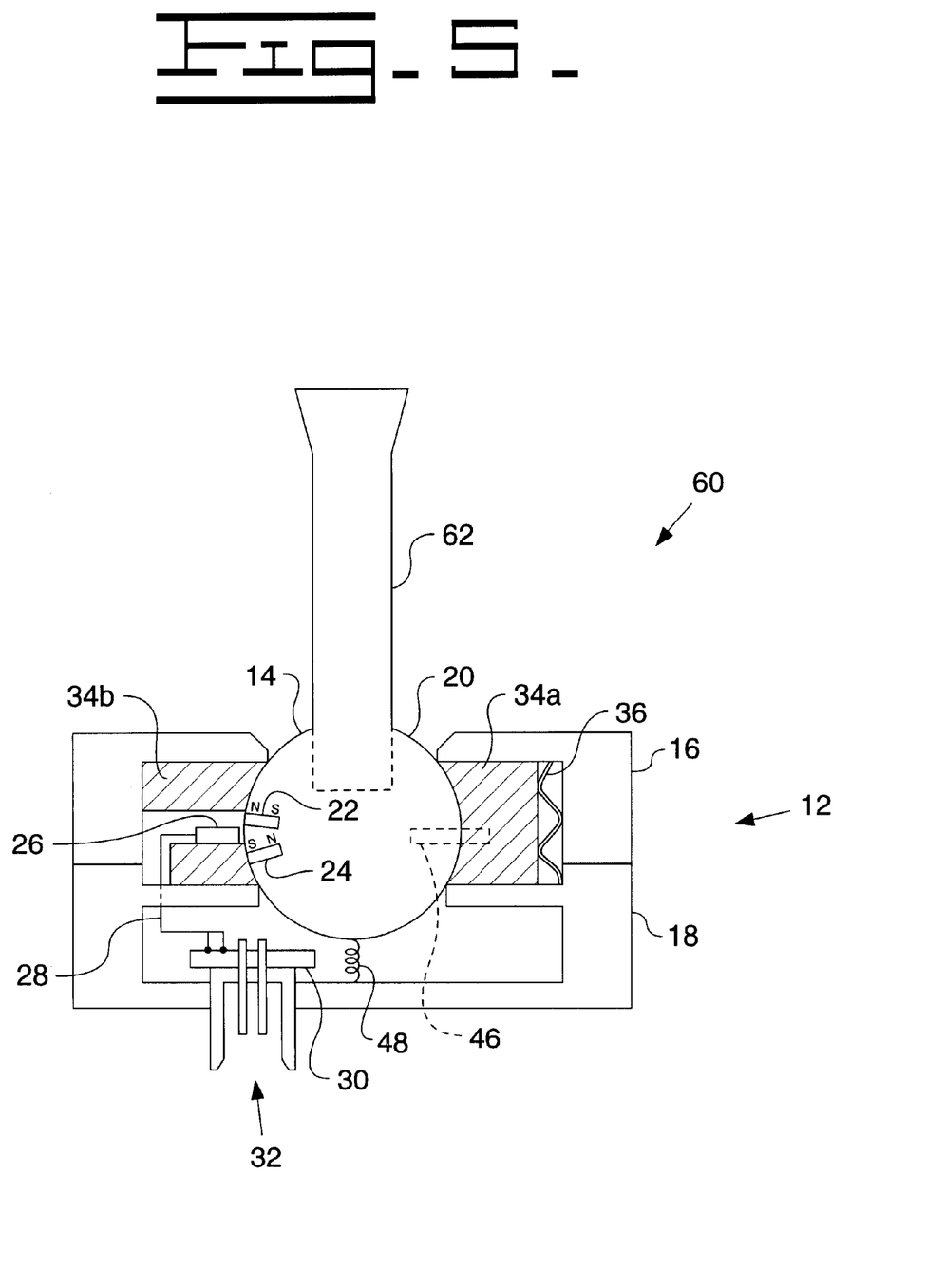
FIG. 5 is a cross sectional view of another input device according to one embodiment of the invention.

FIG. 5 is a cross sectional view of another input device, such as a joystick 60, according to one embodiment of the invention. A shaft 62 may be coupled with the portion of the spherical body 20 within the aperture 14 when the spherical body 20 is in the neutral position, thus forming the joystick 60. Movement of the shaft 62 causes rotation of the spherical body 20, and thus the hall effect device 26 detects magnetic fields that are a function of the position of the shaft 62. The remainder of the joystick 60 functions similarly to what is described above, and will not be repeated.

Figure 6:
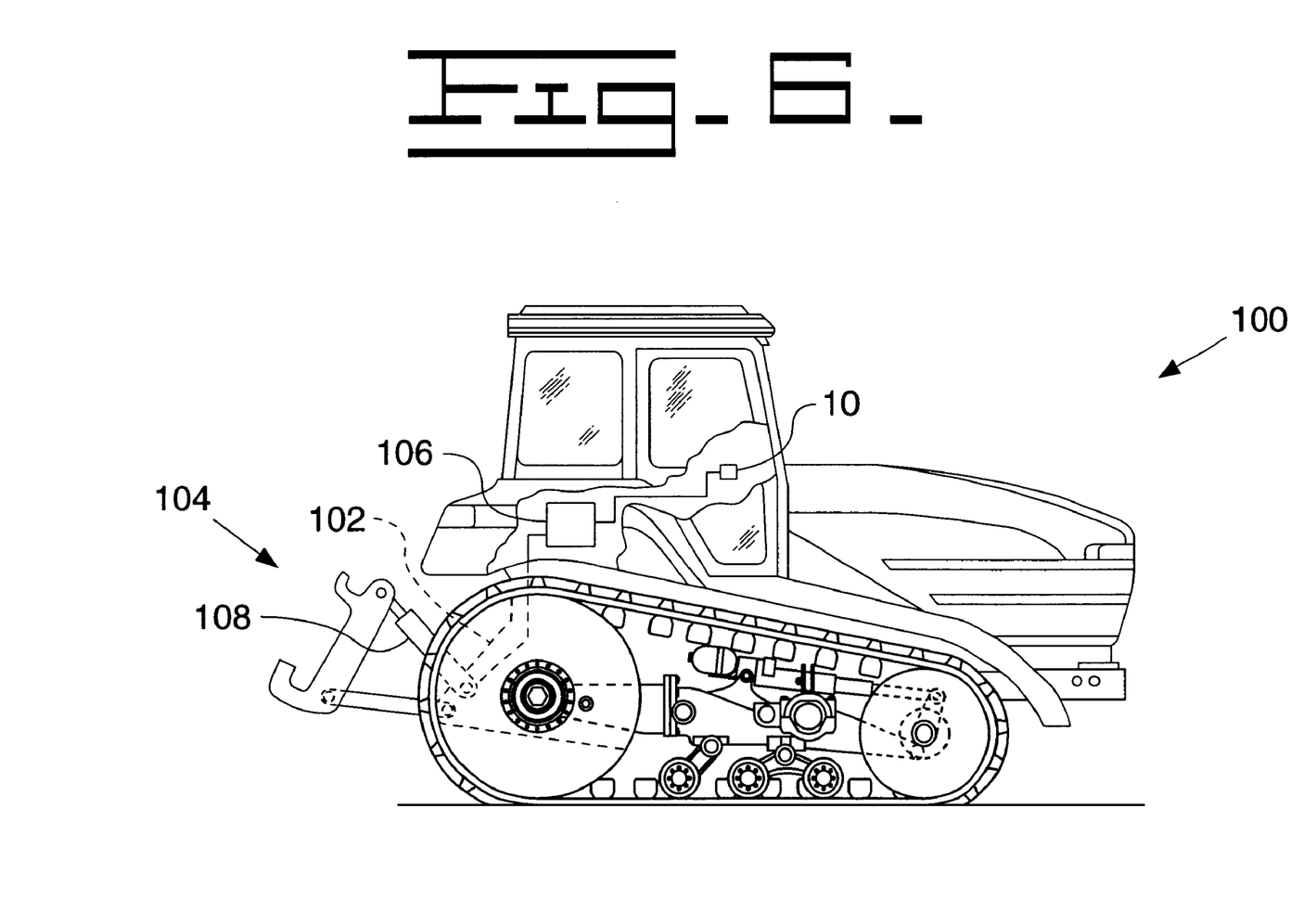
FIG. 6 is a side view of a work machine having the control input device of FIG. 1 according to one embodiment of the invention.

FIG. 6 is a side view of a work machine 100 having a control input device 10 according to one embodiment of the invention. The work machine 100 includes the input device 10 coupled with a frame 102. A work tool 104 is also coupled with the frame. An actuating system, such as a hydraulic pump 106 and hydraulic system 108 is coupled with the work tool and the input device 10. An electronic controller (not shown) is also typically included in the actuating system.

The input device 10 functions similarly to what is described above, and will not be repeated. The actuating system receives the output signal from the input device 10, and controls a function of the work machine 100 as a function of the output signal. The output signal may control adjustments such as raising, lowering, rotating, and tilting of a work tool, the steering of the work machine 100, or throttle control, such as engine speed control. The functioning of actuating systems such as what is described above is known to those skilled in the art, and will not be presented in the interest of brevity.

Typical work tools 104 include hitches, plows, blades, buckets, and a variety of other tools (not shown) known to those skilled in the art. The work machine 100 may be a stationary device, or it may be mobile, such as a tractor or excavator, or any of a variety of other work machines (not shown) known to those skilled in the art.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A control input device, comprising:
   a housing having an aperture;
   a substantially spherical body having a first portion disposed within the housing so as to have a portion of the body disposed within the aperture, the spherical body operable to rotate within the housing;
   a first permanent magnet disposed within the spherical body, the first magnet operable to emit a first magnetic field;
   a second permanent magnet disposed within the spherical body, the second magnet operable to emit a second magnetic field;
   a first magnetic sensing device disposed within the housing, the first magnetic sensing device operable to detect the first and second magnetic fields and to generate a first output signal as a function of the strength of the first and second magnetic fields; and
   a first conductive path coupled with the sensor and operable to transmit the first output signal out of the housing.

2. The control input device of claim 1 wherein the first and second permanent magnets comprise one of a bar magnet and a rod magnet.

3. The control input device of claim 1 wherein the first portion comprises substantially the entire spherical body.

4. The control input device of claim 1 wherein the housing comprises:
   a first portion operable to exert a compressive force on a first part of the spherical body; and
   a second portion coupled with the first portion, the second portion operable to exert a compressive force on a second part of the spherical body, the second compressive force being exerted in an approximately diametrically opposed direction to the first compressive force.

5. The control input device of claim 1, further comprising a shaft coupled with the spherical body, the shaft protruding from the housing and extending in a direction approximately normal to a surface of the spherical body.

6. The control input device of claim 1, further comprising a centering device coupled with the spherical body, the centering device operable to bias the spherical body to a first position.

7. The control input device of claim 6 wherein the centering device comprises a spring.

8. The control input device of claim 6, further comprising a rod coupled with the spherical body and wherein the centering device comprises an elastic material coupled with the housing and the rod, the elastic material operable to deform as a function of movement of the rod, and to rebound substantially back to its original form.

9. The control input device of claim 8 wherein the centering device comprises the elastic material in the approximate shape of a toroid, the rod being disposed within an aperture of the toroid and the housing being coupled with an outer perimeter of the toroid.

10. The control input device of claim 1 wherein the portion of the spherical body disposed within the aperture includes a recess.

11. The control input device of claim 1, further comprising a bearing disposed within the housing, the bearing operable to exert a biasing force on the spherical body.

12. The control input device of claim 11 wherein the bearing is slidably disposed within the housing, and further comprising a wave washer disposed between the bearing and the housing, the wave washer operable to exert the biasing force on the bearing.

13. The control input device of claim 11 wherein the bearing is slidably disposed within the housing, and further comprising a spring disposed between the bearing and the housing, the spring operable to exert the biasing force on the bearing.

14. The control input device of claim 1 wherein the first and second magnets are disposed within the spherical body in a direction approximately normal with a surface of the spherical body, one of the first and second magnets having a north pole disposed substantially flush with the surface and a south pole a predetermined distance from the surface, and the other of the first and second magnets having a south pole disposed substantially flush with the surface and a north pole a predetermined distance from the surface.

15. The control input device of claim 1 further comprising:
   a third permanent magnet disposed within the spherical body, the third magnet operable to emit a third magnetic field;
   a fourth permanent magnet disposed within the spherical body, the fourth magnet operable to emit a fourth magnetic field;
   a second magnetic sensing device disposed within the housing, the second magnetic sensing device operable to detect the third and fourth magnetic fields and to generate a second output signal as a function of the strength of the third and fourth magnetic fields; and
   a second conductive path coupled with the sensor and operable to transmit the second output signal out of the housing.

16. The control input device of claim 15 wherein the third and fourth magnets are disposed within the spherical body approximately 90 degrees from the first and second magnets.

17. The control input device of claim 15 wherein the third and fourth magnets are disposed within the spherical body in a direction approximately normal with a surface of the spherical body, one of the third and fourth magnets having a north pole disposed substantially flush with the surface and a south pole a predetermined distance from the surface, and the other of the third and fourth magnets having a south pole disposed substantially flush with the surface and a north pole a predetermined distance from the surface.

18. The control input device of claim 1, further comprising a pin having a first part disposed within the spherical body and a second part slidably disposed within a slot, the slot operable to prevent rotation of the pin about a predetermined axis.

19. The control input device of claim 18, further comprising a bearing disposed within the housing, the bearing operable to contact the spherical body and to exert a biasing force on the spherical body, and the slot being disposed within the bearing.

20. A control input device, comprising:
   a two-piece housing having an aperture;
   a substantially spherical body having a first portion disposed within the housing so as to have a portion of the body disposed within the aperture, the spherical body operable to rotate within the housing;
   a first rod magnet disposed within the spherical body, the first magnet operable to emit a first magnetic field;
   a second rod magnet disposed within the spherical body, the second magnet operable to emit a second magnetic field;
   a first magnetic sensing device disposed within the housing, the magnetic sensing device operable to detect the first and second magnetic fields and to generate an output signal as a function of the strength of the first and second magnetic fields;
   a conductive path coupled with the sensor and operable to transmit the output signal out of the housing; and
   a shaft coupled with the spherical body, the shaft protruding from the housing and extending in a direction approximately normal to a surface of the spherical body.

21. A work machine, comprising:
   a control input device, comprising:
   a housing having an aperture;
   a substantially spherical body having a first portion disposed within the housing so as to have a portion of the body disposed within the aperture, the spherical body operable to rotate within the housing;
   a first permanent magnet disposed within the spherical body, the first magnet operable to emit a magnetic field;
   a second permanent magnet disposed within the spherical body, the second magnet operable to emit a magnetic field;
   a first magnetic sensing device disposed within the housing, the first magnetic sensing device operable to detect the magnetic fields and to generate a first output signal as a function of the strength of the magnetic fields; and
   a first conductive path coupled with the sensor and operable to transmit the first output signal out of the housing;
   a frame;
   a work tool coupled with the frame; and
   an actuator coupled with the control input device to receive the output signal and with the work tool, the actuator operable to control a function of the work machine as a function of the output signal.

22. The work machine of claim 21 wherein the function of the work machine comprises controlling a position of a work tool.

23. The work machine of claim 21 wherein the function of the work machine comprises engine velocity.

24. The work machine of claim 21 wherein the function of the work machine comprises steering.

* * * * *